(12) United States Patent
Subramanian et al.

(10) Patent No.: US 7,564,820 B2
(45) Date of Patent: Jul. 21, 2009

(54) METHOD AND APPARATUS FOR RESOURCE ALLOCATION AND SCHEDULING

(75) Inventors: Vijay G. Subramanian, Chicago, IL (US); Rajeev Agrawal, Northbrook, IL (US); Randall Berry, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 436 days.

(21) Appl. No.: 10/983,499

(22) Filed: Nov. 8, 2004

(65) Prior Publication Data
US 2005/0111488 A1      May 26, 2005

Related U.S. Application Data

(60) Provisional application No. 60/523,971, filed on Nov. 21, 2003.

(51) Int. Cl.
H04B 7/216    (2006.01)
H04L 27/28    (2006.01)

(52) U.S. Cl. ....................... 370/335; 375/260
(58) Field of Classification Search ........... None
See application file for complete search history.

(56) References Cited

U.S. PATENT DOCUMENTS 6,597,705 B1 * 7/2003 Rezaiifar et al. ............ 370/468
2003/0072297 A1    4/2003 Oses et al.
2003/0072379 A1 *  4/2003 Ketchum ................ 375/260
2003/0081627 A1    5/2003 Bao et al.
2003/0081692 A1 *  5/2003 Kwan et al. ............ 375/295
2003/0128658 A1    7/2003 Walton et al.
2003/0128665 A1    7/2003 Bernhard et al.
2003/0227889 A1 * 12/2003 Wu et al. ................. 370/335
2004/0171359 A1 *  9/2004 Tirkkonen et al. ....... 455/127.1
2004/0192318 A1 *  9/2004 Fisher .................... 455/450
2005/0002357 A1 *  1/2005 Hu et al. ................. 370/332
2007/0026803 A1 *  2/2007 Malm .................... 455/63.1

OTHER PUBLICATIONS

Agrawal, Rajeev, Subramanian, Vijay: "Optimality of Certain Channel Aware Scheduling Policies", Mathematics of Communications Networks, Motorola, Inc., Arlington Heights, all pages, Section 1-9.

* cited by examiner

Primary Examiner—Ricky Ngo
Assistant Examiner—Clemence Han
(74) Attorney, Agent, or Firm—Simon B. Anolick (57) ABSTRACT

A method and apparatus for resource allocation and scheduling within a wireless communication system is provided herein. During resource allocation, a maximum total system transmit power (P), a maximum number of codes available (N), a maximum number of codes for each user in the system ($N=(N_1, \ldots, N_d)$), a maximum SINR value ($S=(S_1, \ldots, S_d)$) for each user in the system, and a SINR per watt of transmit power for each user in the system ($e=(e_1, \ldots, e_d)$) is received by a scheduler. Scheduler then outputs an optimal number of codes per user (n) and power levels per user to (p).

14 Claims, 2 Drawing Sheets

METHOD AND APPARATUS FOR RESOURCE ALLOCATION AND SCHEDULING

REFERENCE(S) TO RELATED APPLICATION(S)

The present application claims priority from provisional application, Ser. No. 60/523,971, entitled "METHOD AND APPARATUS FOR RESOURCE ALLOCATION AND SCHEDULING," filed Nov. 21, 2003, which is commonly owned and incorporated herein by reference in its entirety.

FIELD OF THE INVENTION

The present invention relates generally to resource allocation and scheduling and in particular, to resource allocation and scheduling in an over-the-air communication system.

BACKGROUND OF THE INVENTION

Resource allocation and scheduling within communication systems is generally known in the art. During resource allocation and scheduling, a system controller determines channel parameters for each user, along with a schedule for data transmission. For example, each user within a communication system may be assigned a coding scheme, a power, a number of codes utilized, and a data rate. As known, a communication system generally comprises many users each having their own transmission parameters. A challenge becomes optimizing the communication system by appropriately scheduling each user, and picking appropriate system parameters for each user. Therefore, a need exists for a method and apparatus for scheduling and resource allocation within a communication system that generally optimizes system performance.

DETAILED DESCRIPTION OF THE INVENTION

To address the need for resource allocation and scheduling, a method and apparatus for resource allocation and scheduling within a wireless communication system is provided herein. During resource allocation, a maximum total system transmit power (P), a maximum number of codes available (N), a maximum number of codes for each user in the system ($N=(N_1, \ldots, N_d)$), a maximum SINR value ($S=(S_1, \ldots, S_d)$) for each user in the system, and a SINR per watt of transmit power for each user in the system ($e=(e_1, \ldots, e_d)$) is received by a scheduler. Scheduler then outputs an optimal number of codes per user (n) and power levels per user (p) based on P, N, N, and S.

The present invention encompasses a method for resource allocation. The method comprises the steps of receiving a maximum total system transmit power (P), receiving a maximum number of system codes available (N), receiving a maximum number of codes for each user in the system (N), receiving a maximum SINR value (S) for each user in the system, receiving a SINR per watt of transmit power value for each user in the system (e), determining an optimal number of codes per user (n) and optimal power levels per user (p) based on P, N, N, S, and e, and scheduling users with operating parameters based on n and p.

The present invention additionally encompasses a method for resource allocation. The method comprises the steps of determining a value for an optimal number of codes per user (n) within a communication system, and determining an optimal rate per user (r) and an optimal power per user (to) based on n.

The present invention additionally encompasses an apparatus comprising a scheduler receiving a maximum total system transmit power (P), a maximum number of system codes available (N), a maximum number of codes for each user in the system (N), a maximum SINR value (S) for each user in the system, and a SINR per watt of transmit power value for each user in the system (e), the scheduler outputting an optimal number of codes per user (n) and optimal power levels per user (to) based on P, N, N, S, and e.

Figure 1:
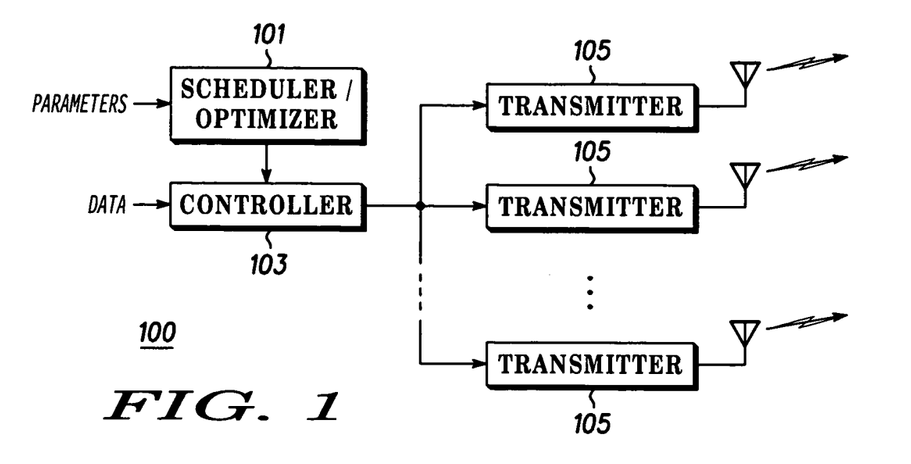
FIG. 1 is a block diagram of a transmission circuitry in accordance with an embodiment of the present invention.

Turning now to the drawings, wherein like numerals designate like components, FIG. 1 is a block diagram of transmission circuitry 100. As shown, transmission circuitry 100 comprises scheduler/optimizer 101, controller 103, and plurality of transmitters 105. During operation, system parameters enter scheduler 101. Scheduler 101 then computes an optimized set of transmission parameters for each transmitter 105 and passes this information to controller 103. During data transmission, controller 103 receives data destined to individual users, and utilizes the set of optimized transmission parameters to appropriately control transmitters 105. When data is passed to transmitters 105, transmitters 105 utilize the transmission parameters to appropriately transmit data to individual users.

As an example, scheduler/optimizer 101 receives a set of users from controller 103 and selects the users for transmission. For each of the users selected, scheduler/optimizer 101 chooses a physical-layer operating point (PLOP) which comprises a particular modulation and coding scheme (MCS), a particular transmit power, a particular number of codes, and a particular information rate. Each PLOP consumes different amounts of overall code and power resources.

Scheduler/optimizer 101 picks the "optimal" PLOP for each user such that the overall system is optimized. In particular, the optimal PLOP for each user is chosen so that a sum of a weighted combination of the rates assigned to users is maximized. The preferred value for the weight vector is the gradient of the utility function at the current throughput estimate.

As discussed above, scheduler/optimizer 101 has the task of optimizing overall system performance based on a given set of input parameters. In the preferred embodiment of the present invention this is accomplished by optimizing a scheduling and resource allocation algorithm. The following text describes, 1) the generation of the resource allocation algorithm, and 2) the optimization of the resource allocation algorithm.

1. Generation of the Resource Allocation Algorithm

Simply stated, optimizing a scheduling algorithm involves maximizing the dot product of the "gradient of utility" (as a function of the throughput and the queue length) defined as $\nabla U(W_t, Q_t) := \phi \nabla_W U(W_t, Q_t) - \nabla_Q U(W_t, Q_t)$ and the rate vector $r_t$ to be selected at each scheduling time t, where:

U is a utility function, $W_t = (W_{1,t}, \ldots, W_{d,t})$ is an estimate of user throughput, $Q_t = (Q_{1,t}, \ldots, Q_{d,t})$ is the user queue length or delay, $\nabla_W U(W_1, Q_1)$ is a vector of partial derivatives of U with respect to W, $\nabla_Q U(W_1, Q_1)$ is a vector of partial derivatives of U with respect to Q, $r_t = (r_{1,t}, \ldots, r_{d,t})$ is a rate vector selected, and d is the number of users.

That is, we would like to pick the rate vector from the state dependent rate region $R(e_t)$, which has the highest projection on the gradient of the utility. The rate region depends on the channel state. While the channel state is not perfectly known we assume there is some estimate of it available through a quality (e.g., CQI) feedback, etc. In particular, we assume that we know the predicted SINR per watt of transmitted power $e_{i,t}$ for each user i and that $e_t = (e_{1,t}, \ldots, e_{d,t})$ captures the channel state $$\max_{r_t \in R(e_t)} \nabla U(W_t, Q_t)^T \cdot r_t = \max_{r_t \in R(e_t)_i} \dot{U}_i(W_{i,t}, Q_{i,t}) r_{i,t}$$

For a certain class of utility functions we have $$\dot{U}_i(W_i, Q_i) := \phi \frac{\partial}{\partial W_i} U_i(W_i, Q_i) - \frac{\partial}{\partial Q_i} U_i(W_i, Q_i) \quad (1)$$

$$= \phi c_i W_i^{\alpha-1} + b_i Q_i^{p-1}$$

$$=: w_i$$

where $c_i$ is the QoS weight associated with the throughput for user i, $d_i$ is the QoS weight associated with the queue length for user i, $\phi$ is filter coefficient associated with the throughput, $\alpha$ is a fairness parameter associated with the throughput, p is a fairness parameter associated with the queue length.

Thus the optimization problem results in $$\max_{r \in R(e)} \sum_i w_i r_i$$

where $w_i$ is given by equation (1) above and where we have suppressed the dependence on time t for convenience. Note that selection of the rate $r_i$ is coupled with the selection of the physical layer operating point (PLOP) that includes the number of codes $n_i$ and the power $p_i$. These PLOP variables need to satisfy system and per user constraints such as $$n_i \leq N_i$$

$$\sum_i n_i \leq N$$

$$\sum_i p_i \leq P$$

and these are part of the description of the state dependent rate region R(e). As described in U.S. Patent Publication No. US 2002/0147022 "Method for Packet Scheduling and Radio Resource Allocation in a Wireless Communication System," by Agrawal, et al., the rate per code can be written in terms of the signal to noise ratio (SINR) per code so that $$\frac{r_i}{n_i} = \Gamma(SINR_i)$$

where the SINR per code is given by $$SINR_i = \frac{p_i}{n_i} e_i$$

and where $\Gamma$ is some appropriate function. A reasonable choice of the function $\Gamma$ is the well known information theoretic channel capacity formula $\Gamma(x) = B\log(1+x)$. Such a functional relation between the rate and the SINR also provides a good curve fit to the High-Speed Downlink Packet Access (HSDPA) MCS table with B equal to the symbol rate (chip rate/spreading factor) which for HSDPA is B=3840000/16=240000 symbols/sec. Note also that for the best curve fit, the SINR is decreased by a factor of A=1.7, i.e., $\Gamma(x) \approx B\log(1+x/A)$ is used. Plugging in this formula results in the following equation for the rate $r_i$ in terms of $e_i$, $n_i$, $p_i$:

$$r_i = n_i B\log\left(1 + \frac{p_i e_i}{A n_i}\right) \quad (2)$$

Note that the SINR per watt of transmit power on a HS-PDSCH code is given by:

$$e_i = \left(\frac{E_c}{N_t}\right)_{pilot} \frac{16}{P_{pilot}}$$

For notational simplicity $e_i$ is redefined to be $e_i/A$ the "effective" SINR per watt of transmit power on a HS-PDSCH code, i.e., $$e_i = \left(\frac{E_c}{N_t}\right)_{pilot} \frac{16}{P_{pilot}} \frac{1}{A}$$

The rate region is then given by $$\mathcal{R}(e) = \left\{ r \geq 0 : r_i = n_i B\log\left(1 + \frac{p_i e_i}{n_i}\right), \right.$$

$$\left. n_i \leq N_i \forall i, \sum_i n_i \leq N, \sum_i p_i \leq P \right\}$$

By redefining $w_i$ to be $$w_i = \frac{B(\phi c_i W_i^{\alpha-1} + b_i Q_i^{p-1})}{\ln 2}$$

where
- w=(w$_1$, ..., w$_d$) is the gradient vector,
- W=(W$_1$, ..., W$_d$) is estimated throughput vector for all the users,
- Q=(Q$_1$, ..., Q$_d$) is estimated throughput vector for all the users,
- $c_i$ is the QoS weight (possibly 0) associated with the throughput for user i,
- $d_i$ is the QoS weight (possibly 0) associated with the queue length for user i,
- $\phi$ is filter coefficient associated with the throughput,
- $\alpha$ is a fairness parameter associated with the throughput,
- p is a fairness parameter associated with the queue length,
- B is a scaling constant to match up the formula to bits.

This is a specific instance of the weight vector w=(w$_1$, ..., w$_d$); however, in general w$_i$ cab be any function of the throughput W$_i$ and queue length Q$_i$ which is non-increasing in the throughput and non-decreasing in the queue length. The function may also take as parameters various QoS related information such as delay requirement, QoS class, bandwidth requirement, etc.

The optimization problem can be rewritten as $$V^* := \max_{(n,p) \in \chi} V(n,p) \quad (3)$$

subject to $$\sum_i n_i \leq N$$

$$\sum_i p_i \leq P \text{ where}$$

$$V(n,p) := \sum_i w_i n_i \ln\left(1 + \frac{p_i e_i}{n_i}\right), \quad (4)$$

$$\chi := \{(n,p) \geq 0 : n_i \leq N_i \ \forall i\},$$

n is a vector of code allocations, i.e. a vector comprising codes per user, p is a vector of power allocations, i.e., a vector comprising power levels per user, w is the vector of w$_i$s, and e is the vector of e$_i$s.

Note that the constraint set $\chi$ is convex. It can also be verified that V is concave in (n,p). In case of a retransmission for a user i the "effective" SINR per watt per code $e_i$ of that user may be bumped up by a suitable factor.

In addition to the constraints captured above, the following per user power constraints are allowed, any of which may be rendered redundant by a suitable setting of the parameters.

peak power constraint:

$p_i \leq P_i, \forall i.$

SINR constraint:

$$SINR_i = \frac{p_i e_i}{n_i} \leq S_i \Leftrightarrow p_i \leq S_i \frac{n_i}{e_i}, \forall i.$$

rate per code (note that the encoder rate assuming a fixed modulation order is a constant times this, viz. the encoder rate is the rate per code divided by the coded output rate which itself is the product of modulation order (2 or 4) times the symbol rate (240000 symbols/sec for HSDPA))

rate $$\frac{r_i}{n_i} = \ln\left(1 + \frac{p_i e_i}{n_i}\right) \leq (R/N)_i \Leftrightarrow p_i \leq (e^{(R/N)_i} - 1)\frac{n_i}{e_i} \ \forall i. \quad (5)$$

$$r_i = n_i \ln\left(1 + \frac{p_i e_i}{n_i}\right) \leq R_i \Leftrightarrow p_i \leq (e^{R_i/n_i} - 1)\frac{n_i}{e_i} \ \forall i.$$

All of the above per user power constraints are special cases of $$SINR_i = \frac{p_i e_i}{n_i} \leq s_i(n_i), \ \forall i, \quad (6)$$

where the function $s_i$ is also dependent on the fixed (for the optimization problem) parameters $P_i, e_i, S_i, R_i, (R/N)_i$. In fact all of the above constraints can be combined into the single constraint (6) above with $$s_i(n_i) = \min\left\{\frac{P_i e_i}{n_i}, S_i, (e^{(R/N)_i} - 1), (e^{R_i/n_i} - 1)\right\}$$

Two special cases of this of interest are:
1. $s_i(n_i) \equiv s_i$ does not depend on $n_i$.
2. $s_i(n_i) \equiv s_i = \infty$.

With the per user power constraints, the constraint set $\chi$ is further restricted to $$\chi := \{(n,p) \geq 0 : n_i \leq N_i, p_i \leq s_i(n_i) n_i / e_i \ \forall i\} \quad (7)$$

The constraint set continues to be convex if $s_i(n_i)n_i$ is a concave function of $n_i$. Note that $s_i(n_i)n_i$ is indeed a concave function of $n_i$ for the two special case (1-2) mentioned above. However, for the rate constraint case (equation 18), $s_i(n_i)n_i$ is convex in $n_i$.

1.1 Handling Retransmissions

As mentioned earlier, users with retransmissions need to be treated differently in two respects:
1. Their effective SINR per watt per code needs to be increased.
2. They have an equality constraint on their rate $r_i = R_i$ The first can be handled easily by adjusting their $e_i$ appropriately. To handle the latter constraint, we observe that the rate constraint is equivalent to $$r_i = \frac{B}{\ln 2} n_i \ln\left(1 + \frac{p_i e_i}{n_i}\right) = R_i \Leftrightarrow p_i = \frac{n_i}{e_i}\left(e^{\frac{R_i \ln 2}{B n_i}} - 1\right) \quad (8)$$

2. Operation of Scheduler/Optimizer

Scheduler/optimizer 101 receives a set of parameters and solves for V* by optimizing the resource allocation algorithm of equation (3). More particularly, scheduler/optimizer 101 receives P=Maximum total system transmit power, N=Maximum total codes available to the system, N=Vector comprising the maximum number of codes (e.g., spreading codes) for each user in the system, R=Vector comprising the maximum data rate for each user in the system, R/N=Vector comprising the maximum data rate per code for each user in the system, P=Vector comprising the maximum transmit power for each user in the system, S=Vector comprising the maximum noise (e.g., SINR) for each user in the system, e=Vector comprising the noise (e.g., SINR) per power (e.g., SINR per watt) for each user in the system, W=Vector comprising the estimated throughput vector for each user in the system, Q=Vector comprising the queue length vector for each user in the system, c=Vector comprising the QoS weight associated with the throughput for each user in the system, and b=Vector comprising the QoS weight associated with the queue length for each user in the system.

In the preferred embodiment of the present invention scheduler/optimizer 101 determines optimal values of $r_i$, $n_i$, and $p_i$ for each user i, outputting vectors r, n, and p for communication system 100. As discussed above, vectors r, n, and p for communication system 100 are determined by solving for V* in equation (3) given the set of input parameters described above. Scheduler/optimizer 101 solves for V* subject to the additional constraints described above in (7).

2.1 First Embodiment

In case $$\sum_i N_i \leq N, n_i = N_i$$

is the optimal code allocation, we are left with just a power optimization problem which can be solved very easily as shown later. Henceforth, we will tackle the case when this is not the case, i.e., $$\sum_i N_i > N.$$

Also, we allow $n_i$ to take on non-integer values as a relaxation to the integer optimization problem. We find that in most cases, the optimal solution turns out to assign integer values to $n_i$. We solve the optimization problem by looking at the dual formulation. Define the Lagrangian $$L(p, n, \lambda, \mu) = \sum_i w_i n_i \ln\left(1 + \frac{p_i e_i}{n_i}\right) + \lambda\left(P - \sum_i p_i\right) + \mu\left(N - \sum_i n_i\right)$$

Based on this we can define the dual function $$L(\lambda, \mu) := \max_{(n,p) \in \chi} L(p, n, \lambda, \mu) \quad (9)$$

where $\chi$ is set of valid choices for (n,p) given by the constraint set (7), $\lambda$ is Lagrange multiplier for the power constraint, and $\mu$ is Lagrange multiplier for the code constraint.

The dual problem is to find $$L^* := \min_{(\lambda,\mu) \geq 0} L(\lambda, \mu) \quad (10)$$

Also, define $$L(\lambda) := \min_{\mu \geq 0} L(\lambda, \mu) = \max_{(n,p) \in \chi} L(p, n, \lambda, \mu) \quad (11)$$

For this part of the solution we will ignore the rate constraint (5) ((8) for retransmissions) or replace it with a linear constraint as described below in "Handling rate restrictions."

Note: Handling Rate Restrictions

The constraint set with the rate restriction (5) or (8) is non-convex, which would not allow us to optimize over $n_i$ very easily. To simply matters, we may assume that $n_i = N_i$ in the second term on the right. Thus we assume that (5) is replaced by $$p_i \leq \frac{n_i}{e_i}(e^{\frac{R_i \ln 2}{BN_i}} - 1)$$

In case of constraint (8), we can replace it by $$p_i = \frac{n_i}{e_i}(e^{\frac{R_i \ln 2}{BN_i}} - 1).$$

This may be justified on a few different grounds. First, we have observed that in many cases the optimal $n_i = N_i$. Secondly substituting $n_i = N_i$ makes things a bit worse for this user, but the bump up in $e_i$ (for the case of retransmissions) will increase the $w_i e_i$ of this user which should probably still help select this user. We could also try putting a different linear approximation to the above constraint. Note that this constraint is only needed for the code allocation part. Some other heuristics are also possible. For instance we may replace the rate constraint as above and if we still pick this user and it gets $n_i = N_i$, then we have most likely not sacrificed anything. Similarly we could try $n_i = 1$ in the second term which should make the user more likely to be selected. If it is still not selected, once again we have probably not sacrificed anything by this approximation. However for the cases in between (which would probably be rare), we may want to explicitly vary the $n_i$ for this user explicitly and optimize. Note that once the code allocation is made, we can work with the original rate constraint for the optimizations over powers.

Since the objective function is concave and the constraint set is convex, there is no duality gap allowing us to use the solution of the dual to compute the solution of the primal.

Figure 2:
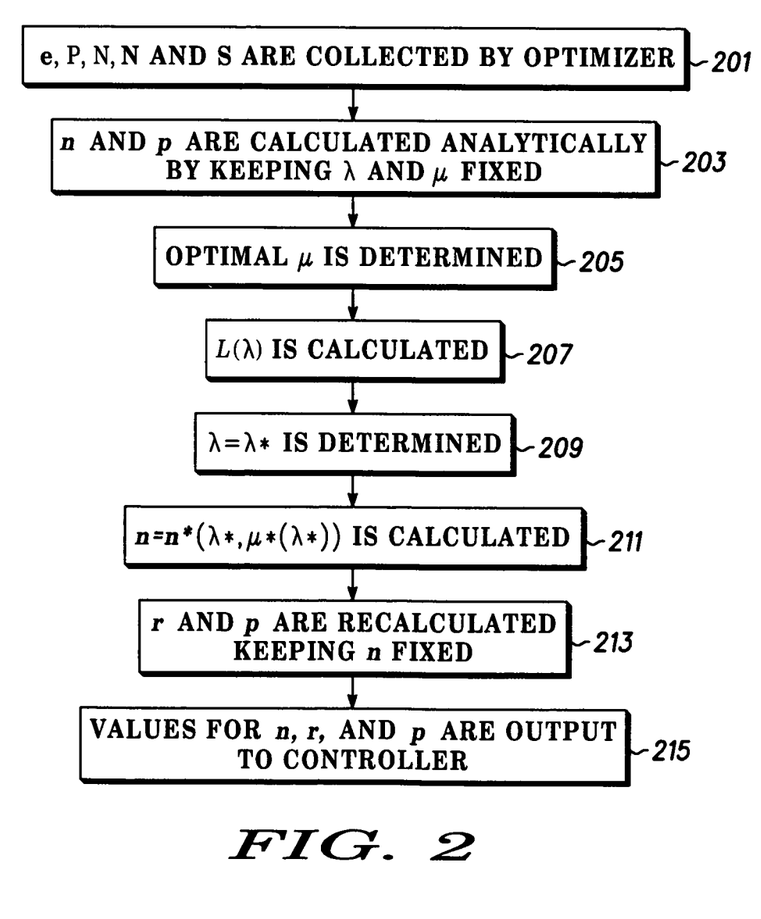
FIG. 2 is a flow chart showing operation of the circuitry of FIG. 1 with an embodiment of the present invention.

Based on this the scheduler/optimizer 101 determines appropriate values for r, n, and p via the following steps (also illustrated in FIG. 2):

1. Collect all the input parameters P, N, N, R, R/N, P, S, e, W, Q, c, b. (Step 201)
2. For a fixed $\lambda$ and $\mu$ find the optimal (n,p) analytically. (Step 203)
3. Then keeping $\lambda$ fixed, find the optimal $\mu^*(\lambda)$. (Step 205)
4. Also, keeping $\lambda$ fixed, calculate L($\lambda$) as defined in equation (11). (Step 207).
5. Numerically search for the optimal $\lambda = \lambda^*$, in other words, search for the value of $\lambda$ that minimizes L($\lambda$) to obtain L*. (Step 209)
6. Calculate n=n*($\lambda^*$,$\mu^*(\lambda^*)$) (Step 211)
7. Calculate optimal p and r keeping n fixed. (Step 213)

FIG. 2 is a flow chart showing operation of scheduler/optimizer 101. The logic flow begins at step 201 where e, P, N, N, and S are collected by the optimizer 101. At step 203 n and p are calculated analytically by keeping $\lambda$ and $\mu$ fixed. In particular $\lambda$ and $\mu$ are fixed but arbitrary and n and p are calculated as a function of $\lambda$ and $\mu$ to optimize the Lagrangian in order to obtain the dual function as shown in equation (9).

At step 205 $\lambda$ is fixed but arbitrary and an optimal $\mu^*(\lambda)$ is determined so that we minimize the dual function $L(\lambda,\mu)$ to obtain $L(\lambda)$. $L(\lambda)$ is calculated per equation 23 at step 207 and a numerical search for an optimal $\lambda=\lambda^*$ occurs at step 209. In other words, at step 209 $\lambda=\lambda^*$ is determined so that $L^*=L(\lambda^*)=\min_{\lambda\geq 0}L(\lambda)$. At step 211 $n=n^*(\lambda^*,\mu^*(\lambda^*))$ is calculated per equation (14). The vector R is collected and r and p are calculated keeping n fixed (step 213). In particular n is fixed to the value obtained in step 5, and p and r are calculated as per equations (21) and (2) taking the actual rate constraint R into account. Finally, at step 215 values for n, p and r are output to controller 103 and utilized to schedule and transmit data via transmitters 105.

The following discussion further details the steps taken above in FIG. 2.

2.1.1 Step 203, for Fixed $\lambda$ and $\mu$ Find the Optimal (n,p) Analytically Optimizing the Lagrangian (in the dual) for a fixed $\lambda$, $\mu$, and n (this includes the optimization over powers assuming a fixed feasible n) we get $$p_i^* = \frac{n_i}{e_i}\begin{cases} 0, & w_i e_i \leq \lambda \\ \frac{w_i e_i}{\lambda} - 1, & \frac{w_i e_i}{1+s_i(n_i)} \leq \lambda < w_i e_i \\ s_i(n_i), & \lambda < \frac{w_i e_i}{1+s_i(n_i)} \end{cases}$$

or equivalently, $$p_i^* = \frac{n_i}{e_i}\left[\min\left\{\frac{w_i e_i}{\lambda} - 1, s_i(n_i)\right\}\right]^+. \quad (12)$$

The resulting SINR per code is given by $$\frac{p_i^* e_i}{n_i} = s^*\left(\frac{w_i e_i}{\lambda}, s_i(n_i)\right) := \left[\min\left\{\frac{w_i e_i}{\lambda} - 1, s_i(n_i)\right\}\right]^+ \quad (13)$$

The last case is vacuous when we have no per user constraints on the powers, i.e., $s_i(n_i)=\infty$. Note that in case $s_i(n_i)\equiv s_i$ does not depend on $n_i$, the resulting SINR per code also does not depend on the number of codes $n_i$ and the power requirement scales linearly in the number of codes.

Define $$h(w_i e_i, s_i(n_i), \lambda) := \begin{cases} 0, & w_i e_i \leq \lambda \\ \left[\frac{\lambda}{w_i e_i} - 1 - \ln\frac{\lambda}{w_i e_i}\right], & \frac{w_i e_i}{1+s_i(n_i)} \leq \lambda < w_i e_i \\ \left[\ln(1+s_i(n_i)) - \frac{\lambda}{w_i e_i}s_i(n_i)\right], & \lambda < \frac{w_i e_i}{1+s_i(n_i)} \end{cases}$$

Then for case (1) $s_i(n_i)\equiv s_i$ does not depend on $n_i$. Additionally, $$h(w_i e_i, s_i(n_i),\lambda)=h(w_i e_i, s_i, \lambda)$$

also does not depend on $n_i$. For this case it is easy to further optimize the Lagrangian over $n_i$ to calculate the dual function. In particular, we find that $$n_i^* = n_i^*(\lambda, \mu) = \begin{cases} 0, & w_i h(w_i e_i, s_i, \lambda) < \mu \\ 0 \leq n_i \leq N_i, & w_i h(w_i e_i, s_i, \lambda) = \mu \\ N_i, & w_i h(w_i e_i, s_i, \lambda) > \mu \end{cases} \quad (14)$$

Note that for the case $\mu=w_i h(w_i e_i, s_i, \lambda)$ any $0\leq n_i N_i$ is optimal. Then the dual function is given by $$L(\lambda, \mu) = \sum_i [\mu_i(\lambda) - \mu]^+ N_i + \mu N + \lambda P \quad (15)$$

where $$\mu_i(\lambda):=w_i h(w_i e_i, s_i, \lambda)$$

2.1.2 Step 205, Fixing $\lambda$ and Optimizing $\mu$.

In order to optimize the dual function (15) over $\mu$, we sort the users in decreasing order of $\mu_i(\lambda)$. Let $j^*$ be the smallest integer such that $$\sum_{i=1}^{j^*} N_i \geq N \quad (16)$$

$$L(\lambda) := \min_{\mu\geq 0} L(\lambda, \mu)$$

$$= \sum_{i=1}^{j^*-1} \mu_i(\lambda)N_i + \mu_{j^*}(\lambda)\left(N - \sum_{i=1}^{j^*-1} N_i\right) + \lambda P$$

and the minimizing $\mu$ is given by $$\mu^*(\lambda) := \mu_{j^*}(\lambda) \quad (17)$$

Note that $\mu_j(\lambda)\geq\mu_{j+1}(\lambda)$ by the above ordering. Thus $\mu^*(\lambda)$ is a threshold; users with their $\mu_i(\lambda)>\mu^*(\lambda)$, get their full code capability and those with $\mu_i(\lambda)<\mu^*(\lambda)$ get none. Also note that when $w_i\geq w_j$ and $e_i>e_j$, $\mu_i(\lambda)\geq\mu_j(\lambda)$, and user i will be given a full code allocation before allocating any codes to user j. This implies that when the fairness parameter $\alpha=1$ (the "max C/I scheduler") and all users have the same QoS weight, $w_i$'s are constant and identical across users and thus packing users into the code budget in order of their $e_i$'s is optimal. This is illustrated below with respect to description of the alternate embodiment of the present invention.

In case $\mu_{j-1}^*(\lambda)>\mu_j^*(\lambda)>\mu_{j+1}^*(\lambda)$, there is a unique feasible n* that satisfies the sum code constraint with equality and that optimizes the Lagrangian for $\mu=\mu^*(\lambda)$. It is given by $$n_i^* = \begin{cases} N_i, & i < j^* \\ N - \sum_{i=1}^{j^*-1} N_i, & i = j^* \\ 0, & i > j^* \end{cases} \quad (18)$$

However, if this is not the case, there is a tie and there are multiple n* that optimize the Lagrangian. However, not all of these choices of n* and the resulting p* given by (18) and (12) will be feasible. In order to achieve feasibility we must also satisfy the additional code and power constraints. Let $n^*(\lambda)$ denote any of the maximizing n constructed above.

We have just shown that the optimal code allocation has the following properties:

1. For the case of $N_i=N$ at most two users will be scheduled.

2. If all $N_i$ are equal, then at most $\lceil N/N_i \rceil+1$ users will be scheduled. All but two users will have their full code allocation.

3. In general all but two users will have their full code allocation.

2.1.3 Step 213 Calculating r and p While Keeping n Fixed.

In step 213 we solve for the optimal powers given a code allocation n. It should be noted that n may be derived as discussed above with reference to steps 203 and 205, or alternatively, n may be pre-determined and provided as an input into the power-optimization algorithm. Denote by $$V^*(n) := \max_{\{p \geq 0: p_i \leq s_i(n_i) n_i/e_i \, \forall i\}} V(n,p)$$

subject to $$\sum_i p_i \leq P.$$

This is solved by finding $\lambda^*(n)$ using the dual formulation and then computing the optimal $p^*(n)$ as described before. Since n is fixed there are no restrictions on the function $n_i s_i(n_i)$ except that it has to be non-negative. Thus, we can incorporate the rate constraints in the calculations performed in this step.

Without loss of generality we remove any users with zero code allocations. Let M be the number of users with positive code allocation. We first need to check if the sum power constraint is inactive, i.e., $$\sum_i p_i = \sum_i \frac{n_i}{e_i} s_i(n_i) \leq P.$$

If this is the case the optimal power allocations are just the individual power constraints $$p_i^* = \frac{n_i}{e_i} s_i(n_i)$$

and we are done.

Henceforth, we proceed when this constraint is active. In this case we can show that the sum power constraint must be satisfied with equality for the optimal powers (otherwise at least one of the users' powers can be increased resulting in a higher primal value function). We can now construct the Lagrangian in the sum power constraint alone.

$$L_p(p,\lambda) := \sum_i w_i n_i \ln\left(1 + \frac{p_i e_i}{n_i}\right) + \lambda\left(P - \sum_i p_i\right)$$

In case $$\sum_i n_i = N,$$

the two Lagrangians are equal. The dual function is given by $$L_p(\lambda) := \max_{\{p \geq 0: p_i \leq s_i(n_i) n_i/e_i \, \forall i\}} L_p(p,\lambda).$$

Note that for optimizing over powers, the constraint set is always convex regardless of the function $s_i(n_i) n_i$. Maximizing $L_p(p,\lambda)$ over p is essentially the same as the problem for $L(p,n,\lambda,\mu)$ as covered in the previous section. The optimal p is given by (12) as before, i.e., $$p_i^*(n,\lambda) = \frac{n_i}{e_i}\left[\min\left\{\frac{w_i e_i}{\lambda} - 1, s_i(n_i)\right\}\right]^+. \quad (19)$$

In Agrawal et al. it was shown that $\lambda^*(n)$ optimizes $L_p(\lambda)$ if and only if the corresponding $p^*(n,\lambda)$ satisfies $$\sum_i p_i^* = P.$$

Substituting from (19) we get that $\lambda^*(n)$ is given by any solution of the equation:

$$\lambda = \frac{\sum_i n_i w_i 1_{\{\frac{w_i e_i}{1+s_i(n_i)} \leq \lambda < w_i e_i\}}}{P - \sum_i \frac{n_i s_i(n_i)}{e_i} 1_{\{\lambda < \frac{w_i e_i}{1+s_i(n_i)}\}} + \sum_i \frac{n_i}{e_i} 1_{\{\frac{w_i e_i}{1+s_i(n_i)} \leq \lambda < w_i e_i\}}}. \quad (20)$$

Then the optimal power allocation vector $p^*(n)$ is given by $$p_i^*(n) = p_i^*(n, \lambda^*(n)) = \frac{n_i}{e_i}\left[\min\left\{\frac{w_i e_i}{\lambda^*(n)} - 1, s_i(n_i)\right\}\right]^+. \quad (21)$$

Since $\lambda$ occurs on both sides of equation (20) solving for $\lambda^*(n)$ may seem hard. We provide an algorithm solution to this as follows:

For users $i=1,\ldots,M$, define $$b_i = w_i e_i$$

$$a_i = \frac{w_i e_i}{1 + s_i(n_i)}.$$

Note that $a_i < b_i$. Sort the set $\{a_i, b_i; i=1,\ldots,2M\}$ into a decreasing set of numbers $\{x[l]; l=1,\ldots,2M\}$. For, each $l=1,\ldots,2M$ also let $y[l]:=i$ if $x[l]=b_i$ or $x[l]=a_i$, and let $$z[l] := \begin{cases} 1, & \text{if } x[l] = a_{y[l]} \\ 0, & \text{otherwise} \end{cases}.$$

Ties are resolved arbitrarily. Next find the largest $\lambda \in \{x[l]; l=1, \ldots, 2M\}$ such that $$\sum_i p_i^*(n, \lambda) \geq P,$$

i.e., find the smallest l such that $$\sum_i p_i^*(n, x[l]) \geq P.$$

In the paper "Joint Scheduling and Resource Allocation in CDMA Systems," by Agrawal et al., we have shown that $\lambda^*(n) \in [x[l], x[l-1])$ and is given by the solution of equation (20). Moreover for $\lambda$ in the above range, the indicators in equation (20) are not dependent on the particular value of $\lambda$ and hence we have an easily computable expression for $\lambda$.

Below we provide pseudo-code for an algorithm that finds the solution to the above equation (20). The algorithm complexity is O(MlogM) due to a sort.

Pseudo-code for Preferred Embodiment of Solution $\lambda^*(n)$

```
lambda ()
{
    Psum = 0;
    Ppossum = 0;
    Pmaxsum = 0;
    nwpossum = 0;
    for (i=1, i <= M, i++) {
        pos[i] = 0;
        max[i] = 0;
    }
    l = 1;
    while (Psum < P && l < 2M) {
        i = y[l]
        if (z[l] = 1) { max[i] = 1;
            Pmaxsum += n_i/e_i s_i(n_i);
            // Pmaxsum = Σ_i (n_i/e_i * s_i(n_i) * max[i])
            Ppossum -= n_i/e_i;
            // Ppossum = Σ_i (n_i/e_i * (pos[i] − max[i]))
            nwpossum -= n_i * w_i;
            // nwpossum = Σ_i (n_i * w_i * (pos[i] − max[i]))
        }
        else{
            pos[i] = 1;
            Ppossum += n_i/e_i;
            // Ppossum = Σ_i (n_i/e_i * (pos[i] − max[i]))
            nwpossum += n_i * w_i;
            // nwpossum = Σ_i (n_i * w_i * (pos[i] − max[i]))
        }
        l++;
        Psum = Σ_i (n_i/e_i s * (w_i e_i / x[l], s_i(n_i)));
    }
    lambda = Ppossum/(P − Pmaxsum);
    it (lambda > x[l−1] or lambda > x[l]) {
        error!
    }
    else{
        return (lambda)
    }
}
``` where $s * \left( \frac{w_i e_i}{\lambda}, s_i(n_i) \right)$ is defined in equation (13).

2.1.3.1 Per User Equality Constraints

If for some user i, the inequality $p_i \leq e_i s_i(n_i) n_i$ is replaced by the equality constraint $p_i = e_i s_i(n_i) n_i$, as may happen for instance in a retransmission when the rate is fixed, we may simply remove this user from the problem after subtracting $p_i$ from P and proceed as before.

2.1.3.2 No Per User Power Constraints

For the case that $s_i(n_i) = \infty$, the following simpler algorithm finds $\lambda^*(n)$. First, without loss of generality, assume that the users are numbered in descreasing order of $w_i e_i$. Calculate the following $$\tilde{\lambda}_j = \frac{\sum_{i=1}^{j} w_i n_i}{P + \sum_{i=1}^{j} \frac{n_i}{e_i}} \quad \forall j \in \{1, 2, \ldots, M\}$$

We determine $\lambda^*(n)$ as follows:
 1. Set j=1.
 2. While $w_{j+1} e_{j+1} > \tilde{\lambda}_j$, j++
 3. $\lambda^* = \tilde{\lambda}_j$ 2.1.4 Step 209, Obtaining L*.

Any algorithm that minimizes or attempts to minimize $L(\lambda)$ over $\lambda$ is considered here. In the preferred embodiment we do so iteratively, where in each step k of the iteration we narrow the range $[\lambda_k^{LB}, \lambda_k^{UB}]$ of the optimal $\lambda^*$ in a manner such that starting at k=0 with $0 \leq \lambda_0^{LB} \leq \lambda_0^{UB} < \infty$ and for some $d \geq 1$ and $0 \leq \rho < 1$, $$[\lambda_{(k+1)d}^{UB} - \lambda_{(k+1)d}^{LB}] \leq \rho [\lambda_{kd}^{UB} - \lambda_{kd}^{LB}] \; \forall k \geq 0.$$

A plurality of such schemes may be designed all of which guarantee geometrically fast convergence to the optimal $\lambda^*$. Two such embodiments are described below.

2.1.4.1 First Embodiment for Finding $\lambda^*$

The algorithm makes use of the functions $L(\lambda)$ (11), $n^*(\lambda)$ (18) and the tie resolution, $\lambda^*(n)$ (20), $p^*(n)$ (21), and $V(p,n)$ (4) defined earlier. The function $r(p,n)$ is simply the rate given the powers and codes given in (2). Pseudo-code for calculating $\lambda^*(n)$ is also given in Step 213.

In "Joint scheduling and resource allocation in CDMA systems," by R. Agrawal, V. Subramanian, R. Berry, G. Casheekar, A. Diwan, B. Love, it was shown that $L(\lambda)$ is convex and that the optimal $\lambda^* = \text{argmin}_{\lambda \geq 0} L(\lambda) \in [\lambda^{min}, \lambda^{max}]$ where $\lambda^{min} = 0$ and $\lambda^{max} = \max_i w_i e_i$.

At the $k^{th}$ iteration we identify $\lambda^*$ in the range $[\lambda_k^{LB}, \lambda_k^{UB}]$ with the estimate of $\lambda^*$ given by $\lambda_k^*$. The state of the algorithm at any time k is given by $$S_k = \{[\lambda_k^{LB}, L_k^{LB}], [\lambda_k^*, L_k^*, n_{k*}], [\lambda_k^{UB}, L_k^{UB}]\}$$

with the assumption that $L_k^* = L(\lambda_k^*) \leq \min(L_k^{UB} = L(\lambda_k^{UB}), L_k^{LB} = L(\lambda_k^{LB}))$.

Step 0 initializes the state of this algorithm and provides an exit check in case we got lucky to hit the optimal allocation.

Step 1 does the iteration on the above state of the algorithm and also uses an exit check.

Step 2 polishes up by taking additional constraints into account and reoptimizing the powers, calculating rates/TBS etc.

The algorithm works as follows.

Step 0: Initialize
(a) $\lambda_0^{LB} = 0$
(b) If there are no per user power constraints on at least one user then $L(\lambda_0^{LB}) = +\infty$.
(c) Else calculate $L(\lambda_0^{LB})$.
(d) Sort users in decreasing order of $w_i e_i$.
(e) Find smallest $j^*$ such that $$\sum_{i=1}^{j^*-1} N_i < N \leq \sum_{i=1}^{j^*} N_i$$

(f) Define $n_0^*$ $$n_{0,i}^* = \begin{cases} N_i & i < j^* \\ N - \sum_{i=1}^{j-1} N_i & i = j^* \\ 0 & i > j^* \end{cases}$$

(g) In case of a tie for j pick the user with the larger $w_i$ and if the $w_i$s are also equal, pick either.
(h) If $n_{j,0} = N_j^*$ then $$P_{req} = \sum_{i=1}^{j^*} \frac{n_{i,0}}{e_i} \min\left(\left(\frac{w_i e_i}{w_{j^*+1} e_{j^*+1}} - 1\right), s_i\right)$$

(i) Else $$P_{req} = \sum_{i=1}^{j^*} \frac{n_{i,0}}{e_i} \min\left(\left(\frac{w_i e_i}{w_{j^*} e_{j^*}} - 1\right), s_i\right)$$

(j) If $P_{req} \geq P$, then go to Step 2.
(k) If $n_{j,0}^* = N_j^*$ then $\lambda_0^{UB} = w_{j+1}^* e_{j+1}^*$, else $\lambda_0^{UB} = w_j^* e_j^*$.
(l) Calculate $L_0^{UB} = L(\lambda_0^{UB})$.
(m) If $L_0^{LB} \leq L_0^{UB}$, then $\lambda_0^* = \lambda_0^{LB}$; $L_0^* = L_0^B$.
(n) Else $\lambda_0^* = \lambda_0^{UB}$; $L_0^* = L_0^{UB}$.

Step 1: Iterate For ( k=0, k<iteration limit, k++)
(a) If $L_k^* > \min(L_k^{LB}, L_k^{UB})$, then error!
(b) Calculate $\lambda_{k+1}^{CAND} = \lambda^*(n_k^*)$)
(c) Calculate $L_{k+1}^{CAND} = L(\lambda_{k+1}^{CAND})$, $n_{k+1}^{CAND} = n^*(\lambda_{k+1}^{CAND})$.
(d) Calculate $\lambda^*(n_{k+1}^{CAND})$, $p_{k+1}^{CAND} = p^*(n_{k+1}^{CAND})$
(e) Calculate $V(n_{k+1}^{CAND})$.
(f) If $V(n_{k+1}^{CAND}) > (1-[\text{epsilon}]) \min\{L_{k+1}^{CAND}, L_k^*\}$, then go to Step 2.
(g) If $L_{k+1}^{CAND} < L_k^*$ and $\lambda_{k+1}^{CAND} > \lambda_k^{LB} + [\text{epsilon}](\lambda_k^{UB} - \lambda_k^{LB})$ and $\lambda_{k+1}^{CAND} < \lambda_k^{UB} - [\text{epsilon}](\lambda_k^{UB} - \lambda_k^{LB})$ and $\lambda_{k+1}^{CAND} \neq \lambda_k^*$ TRY FASTER TRACK
  i. If f $\lambda_{k+1}^{CAND} < \lambda_k^*$ $\lambda_{k+1}^{UB} = \lambda_k^*$ $\lambda_{k+1}^* = \lambda_{k+1}^{CAND}$ $\lambda_{k+1}^{LB} \lambda_k^{LB}$ ii. Else $\lambda_{k+1}^{LB} = \lambda_k^*$ $\lambda_{k+1}^* = \lambda_{k+1}^{CAND}$ $\lambda_{k+1}^{UB} = \lambda_k^{UB}$ (h) Else
DO BISECTION
  i. If $\lambda_k^* - \lambda_k^{LB} \geq \lambda_k^{UB} - \lambda_k^*$ then
    A. Assign $\lambda_{k+1}^{CAND} = (\lambda_k^{LB} + \lambda_k^*)/2$ B. Calculate $L_{k+1}^{CAND} = L(\lambda_{k+1}^{CAND})$, $n_{k+1}^{CAND} = n^*(\lambda_{k+1}^{CAND})$.

C. Calculate $\lambda^*(n_{k+1}^{CAND})$, $p_{k+1}^{CAND} = p^*(n_{k+1}^{CAND})$ D. Calculate $V(n_{k+1}^{CAND})$.

E. If $V(n_{k+1}^{CAND}) > (1-[\text{epsilon}]) \min\{L_{k+1}^{CAND}, L_k^*\}$, then go to Step 2.
    F. If $L_{k+1}^{CAND} \leq L_k^*$, then change the algorithm state as follows $\lambda_{k+1}^{UB} = \lambda_k^*$ $L_{k+1}^{UB} = L_k^*$ $\lambda_{k+1}^* = \lambda_{k+1}^{CAND}$ $L_{k+1}^* = L_{k+1}^{CAND}$ $n_{k+1}^* = n_{k+1}^{CAND}$ $\lambda_{k+1}^{LB} = \lambda_k^{LB}$ $L_{k+1}^{LB} = L_k^{LB}$ G. Else change as follows $\lambda_{k+1}^{LB} = \lambda_{k+1}^{CAND}$ $L_{k+1}^{LB} = L_{k+1}^{CAND}$ $\lambda_{k+1}^* = \lambda_k^*$ $L_{k+1}^* = L_k^*$ $n_{k+1}^* = n_k^*$ $\lambda_{k+1}^{UB} = \lambda_{k+1}^{UB}$ $L_{k+1}^{UB} L_k^{UB}$ ii. Else
   A. Assign $\lambda_{k+1}^{CAND} = (\lambda_k^{UB} + \lambda_k^*)/2$ B. Calculate $L_{k+1}^{CAND} = L(\lambda_{k+1}^{CAND})$, $n_{k+1}^{CAND} = n^*(\lambda_{k+1}^{CAND})$.

C. Calculate $\lambda^*(n_{k+1}^{CAND})$, $p_{k+1}^{CAND} = p^*(n_{k+1}^{CAND})$ D. Calculate $V(n_{k+1}^{CAND})$.

E. If $V(n_{k+1}^{CAND}) > (1-[epsilon])\min\{L_{k+1}^{CAND}, L_k^*\}$, then go to Step 2.
   F. If $L_{k+1}^{CAND} \leq L_k^*$, then change the algorithm state as follows $\lambda_{k+1}^{LB} = \lambda_k^*$ $L_{k+1}^{LB} = L_k^*$ $\lambda_{k+1}^* = \lambda_{k+1}^{CAND}$ $L^* = L_{k+1}^{CAND}$ $n_{k+1}^* = n_{k+1}^{CAND}$ $\lambda_{k+1}^{UB} = \lambda_k^{UB}$ $L_{k+1}^{UB} = L_k^{UB}$ G. Else change as follows $\lambda_{k+1}^{LB} = \lambda_{k+1}^{LB}$ $L_{k+1}^{LB} = L_{k+1}^{LB}$ $\lambda_{k+1}^* = \lambda_k^*$ $L_{k+1}^* = L_k^*$ $n_{k+1}^* = n_k^*$ $\lambda_{k+1}^{UB} = \lambda_{k+1}^{CAND}$ $L_{k+1}^{CAND} = L_{k+1}^{CAND}$ Step 2:
(a) Round n*—note two users may have non-integer allocations in the case of tie. In that case round down the one with the greater power per code requirement and round up the other one.
(b) Recalculate p*(n*) taking all constraints including rate constraints into account.
(c) Calculate the rate r*=r(p*,n*) given by $$r_i^* = \frac{240000}{\ln 2} n_i^* \ln\left(1 + \frac{p_i^* e_i}{n_i^*}\right)$$

and TBS=$r_i \times 0.002$. Round down to nearest byte or some even coarser quantization.

We can also skip steps (b)-(g) in Step 1 to get a pure bisection based search algorithm.

2.1.4.2 Second Embodiment for Finding $\lambda^*$

The second embodiment for finding the optimal $\lambda^*$ uses subgradients of $L(\lambda)$ to aid in its minimization. For any given $\lambda$, a subgradient can easily be found as follows:

1. First find n*($\lambda$) in equation (18). In case of a "tie" all feasible code allocations which satisfy the sum power constraint with equality and optimize the Lagrangian (as described after equation (18)) are considered.
2. Next, using n*($\lambda$) find the corresponding p* as given by equation (12)
3. Then $$P - \sum_i p_i^*$$

is a subgradient to $L(\lambda)$ at $\lambda$.

4. Since $L(\lambda)$ is convex, $\lambda^*$ will be optimal if and only if 0 is a subgradient of $L(\lambda^*)$.
5. Thus, we can find the optimal $\lambda^*$ that minimizes $L(\lambda)$ by numerically searching for $\lambda$ with a 0 subgradient.

2.2 Other Embodiments

Figure 3:
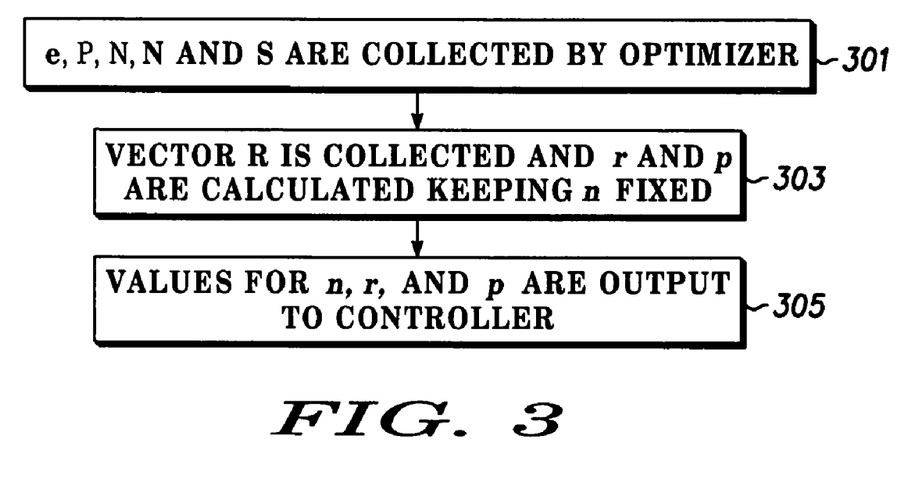
FIG. 3 is a flow chart showing operation of the circuitry of FIG. 1 with another embodiment of the present invention.

Based on the above results scheduler/optimizer 101 determines appropriate values for r, n, and p as follows:

1. Collect all the input parameters P, N, N, R, R/N, P, S, e, W, Q, c, b. (Step 301)
2. Calculate n. (Step 303)
3. Calculate optimal p and r keeping n fixed. (Step 305)

This is illustrated in FIG. 3, where FIG. 3 is a flow chart showing operation of scheduler/optimizer 101 in accordance with another embodiment of the present invention. The logic flow begins at step 301 where P, N, N, R, R/N, P, S, e, W, Q, c, and b are collected by the optimizer 101. Note that steps 2-5 in the first embodiment were really aids to calculating the optimal n. We consider any other method to calculate n based on the input parameters P, N, N, R, R/N, P, S, e, W, W, Q, c, and b (Step 303). Then, r and p are calculated keeping n fixed (step 305). In particular n is fixed to the value obtained in Step 303, and p and r are calculated as per equations (21) and (2) taking the actual rate constraint R into account. Finally, at step 307 values for n, p and r are output to controller 103 and utilized to schedule and transmit data via transmitters 105.

An alternative method of calculating n based on the input parameters e, P, N, N, and S, is presented below:

1. Sort users based on any metric that is a function of the input parameters including $w_i$ and $e_i$.
2. Find smallest j* such that $$\sum_{i=1}^{j^*-1} N_i < N \leq \sum_{i=1}^{j^*} N_i$$

3. Define $n_0$ $$n_{0,i}^* = \begin{cases} N_i & i < j^* \\ N - \sum_{i=1}^{j-1} N_i & i = j^* \\ 0 & i > j^* \end{cases}$$

4. In case of a tie for j* pick the user with the larger $w_i$ and if the $w_i$s are also equal, pick either.
5. Optionally, we can also run one or more iteration of the algorithm described in the previous section.

While the invention has been particularly shown and described with reference to particular embodiments, it will be understood by those skilled in the art that various changes in form and details may be made therein without departing from the spirit and scope of the invention. For example, although examples where given above with respect to implementations within an HSDPA system, one of ordinary skill in the art will recognize that the above embodiments may be implanted in any communication system where codes and/or power need to be allocated. It is intended that such changes come within the scope of the following claims.

What is claimed is:

1. A method for resource allocation, the method comprising:

receiving, at a scheduler, a maximum total system transmit power (P);

receiving, at a scheduler, a maximum number of system codes available (N);

receiving, at a scheduler, a maximum number of codes for each user in the system (N);

receiving, at a scheduler, a maximum SINR value (S) for each user in the system;

receiving, at a scheduler, a SINR per watt of transmit power value for each user in the system (e);

determining an optimal number of codes per user (n) and optimal power levels per user (p) based on P, N, N, S, and e comprising maximizing a dot product of a weight vector as a function of a throughput/queue length $w_t = (w_1(W_{1,t}, Q_{1,t}), \ldots, w_d(W_{d,t}, Q_{d,t}))$ and a rate vector $r_t$ to be selected at a scheduling time t, where:

$w_t = (w_{1,t}, \ldots, w_{d,t})$ is a weight vector, $w_t = (w_{1,t}, \ldots, w_{d,t})$ is a vector of estimates of user throughputs, $Q_t = (Q_{1,t}, \ldots, Q_{d,t})$ is the vector of user queue lengths or delays, $r_t = (r_{1,t}, \ldots, r_{d,t})$ is a rate vector selected, and d is the number of users; and scheduling, at a scheduler, users with operating parameters based on n and p.

2. The method of claim 1 further comprising determining an optimal rate for each user (r) based on n and p.

3. The method of claim 1 wherein determining n and p comprises maximizing a dot product of a weight vector as a function of a throughput/queue length $w_t = (w_1(W_{1,t}, Q_{1,t}), \ldots, w_d(W_{d,t}, Q_{d,t}))$ and a rate vector $r_t$ to be selected at a scheduling time t, where:

$w_t = (w_{1,t}, \ldots, w_{d,t})$ is a weight vector, $W_t = (W_{1,t}, \ldots, W_{d,t})$ is a vector of estimates of user throughputs, $Q_t = (W_{1,t}, \ldots, Q_{d,t})$ is the vector of user queue lengths or delays, $r_t = (r_{1,t}, \ldots, r_{d,t})$ is a rate vector selected, and d is the number of users.

4. A method for resource allocation, the method comprising:

receiving, at a scheduler, a maximum total system transmit power (P);

receiving, at a scheduler, a maximum number of system codes available (N);

receiving, at a scheduler, a maximum number of codes for each user in the system (N);

receiving, at a scheduler, a maximum SINR value (S) for each user in the system;

receiving, at a scheduler, a SINR per watt of transmit power value for each user in the system (e);

determining, at a scheduler, an optimal number of codes per user (n) and optimal power levels per user (p) based on P, N, N, S, and e comprising the step of determining:

$$V^* := \max_{(n,p) \in \chi} V(n,p)$$

subject to $$\sum_i n_i \leq N$$

$$\sum_i p_i \leq P$$

where $$V(n, p) := \sum_i w_i n_i \ln\left(1 + \frac{p_i e_i}{n_i}\right)$$

$$\chi := \{(n, p) \geq 0 : n_i \leq N_i, p_i \leq S_i n_i / e_i \; \forall \; i\},$$

w is the vector of weights $w_i$s, e is the vector of SINR per watt of transmit power $e_i$s, S is the vector of maximum SINR $S_i$s, $w_i = f_i(W_i, Q_i)$, and where $W = (W_1, \ldots, W_d)$ is estimated throughput vector for all the users, $Q = (Q_1, \ldots, Q_d)$ is queue length or delay vector for all the users, and $f_i$ is some function of the throughput and/or queue length for user i and it depends on the QoS class and parameters for user i.

5. The method of claim 4 further comprising determining an optimal rate for each user (r) based on n and p.

6. A method for resource allocation, the method comprising:

determining, at a scheduler, a value for an optimal number of codes per user (n) within a communication system comprising calculating $n = n^*(\lambda^*, \mu^*(\lambda^*))$ where $\lambda^*$ is an optimal Lagrange multiplier for a power constraint;

$\mu^*(\lambda)$ is a optimal Lagrange multiplier $\mu$ for a code constraint (as a function of the Langrange multiplier for the power constraint $\lambda$), and $n^*(\lambda, \mu)$ is an optimal code allocation as a function of $\lambda, \mu$; and determining, at a scheduler, an optimal rate per user (r) and an optimal power per user (p) based on n.

7. The method of claim 6 wherein the step of determining the value for n, comprises the step of receiving a pre-determined value for n.

8. A method for resource allocation, the method comprising:

determining, at a scheduler, a value for an optimal number of codes per user (n) within a communication system; and determining, at a scheduler, an optimal rate per user (r) and an optimal power per user (p) based on n comprising the step of:

calculating $n = p^*(n) = p^*(n, \lambda^*(n))$;

where $\lambda^*(n)$ is an optimal Lagrange multiplier for the power constraint; and $p^*(n, \lambda)$ is the optimal power allocation as a function of n, $\lambda$.

9. The method of claim 8 wherein the step of determining the value for n, comprises the step of receiving a pre-determined value for n.

10. A method of resource allocation, the method comprising:

determining, at a scheduler, a value for n, comprising the steps of:

sorting, at a scheduler, users in descending order based on a metric that is a function of $w_i$ and $e_i$, where $e_i$ is a SINR per watt of transmit power value and $w_i$ is the gradient/weight for each user i in the system;

determining, at a scheduler, a smallest j* such that $$\sum_{i=1}^{j^*-1} N_i < N \le \sum_{i=1}^{j^*} N_i$$

determining, at a scheduler, n such that $$n_i = \begin{cases} N_i & i < j^* \\ N - \sum_{i=1}^{j-1} N_i & i = j^*, \\ 0 & i > j^* \end{cases}$$

and determining, at a scheduler, an optimal rate per user (r) and an optimal power per user (ii) based on n.

11. An apparatus comprising:

a scheduler receiving a maximum total system transmit power (P), a maximum number of system codes available (N), a maximum number of codes for each user in the system (N), a maximum SINR value (S) for each user in the system, and a SINR per watt of transmit power value for each user in the system (e), the scheduler outputting an optimal number of codes per user (n) and optimal power levels per user (p) based on P, N, N, S, and e and wherein n and p are determined by maximizing a dot product of a weight vector as a function of the throughput/queue length $w_t = (w_1(W_{1,t},Q_{1,t}), \ldots, w_d(W_{d,t},Q_{d,t}))$ and a rate vector $r_t$ to be selected at a scheduling time t, where:

$w_t = (w_{1,t}, \ldots, w_{d,t})$ is a weight vector, $W_t = (W_{1,t}, \ldots, W_{d,t})$ is a vector of estimates of user throughputs, $Q_t = (Q_{1,t}, \ldots, Q_{d,t})$ is the vector of user queue lengths, $r_t = (r_{1,t}, \ldots, r_{d,t})$ is a rate vector selected and d is the number of users.

12. The apparatus of claim 11 further comprising:

a controller scheduling transmissions to users with physical layer operating points based on n and p.

13. An apparatus comprising:

a scheduler receiving a maximum total system transmit power (P), a maximum number of system codes available (N), a maximum number of codes for each user in the system (N), a maximum STNR value (S) for each user in the system, and a SINR per watt of transmit power value for each user in the system (e), the scheduler outputting an optimal number of codes per user (n) and optimal power levels per user (p) based on P, N, N, S, and e and wherein n and p determined by computing:

$$V^* := \max_{(n,p) \in \chi} V(n,p)$$

subject to $$\sum_i n_i \le N$$

$$\sum_i p_i \le P$$

where $$V(n, p) := \sum_i w_i n_i \ln\left(1 + \frac{p_i e_i}{n_i}\right)$$

$$\chi := \{(n, p) \ge 0 : n_i \le N_i, \, p_i \le S_i n_i / e_i \; \forall \, i\},$$

e is the vector of SINR per watt of transmit power $e_i$s, $w_i = f_i(W_i, Q_i)$, and where $W = (W_1, \ldots, W_d)$ is estimated throughput vector for all the users, $Q = (Q_1, \ldots, Q_d)$ is queue length vector for all the users, and $f_i$ is a function of a throughput and/or queue length for user i.

14. The apparatus of claim 13 further comprising:

a controller scheduling transmissions to users with physical layer operating points based on n and p.

* * * * *